July 25, 1961 C. K. BOWMAN 2,993,721
LIQUID-BALLAST COMPARTMENTALIZED BUMPER
Filed Feb. 4, 1958 2 Sheets-Sheet 1
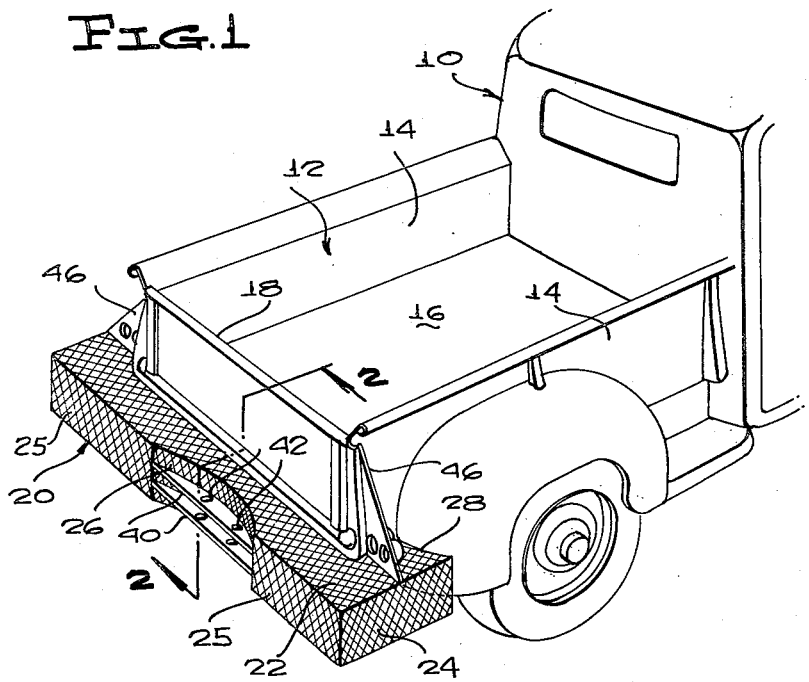
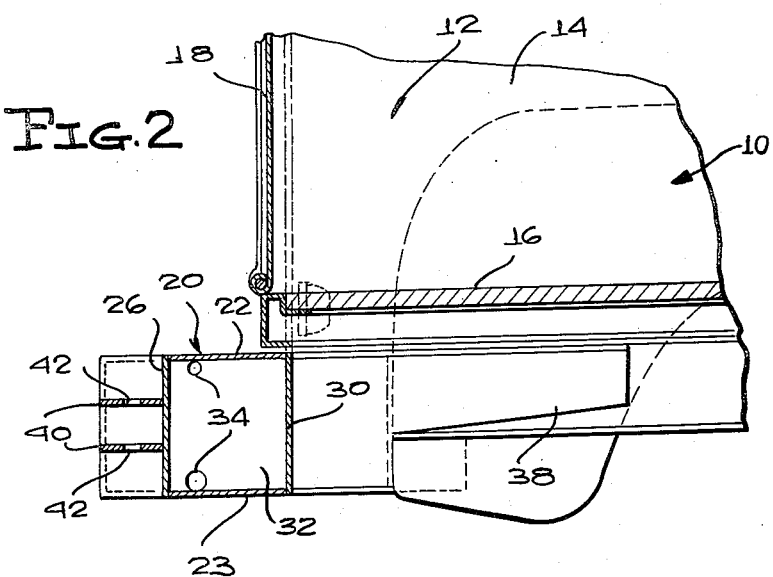
INVENTOR.
CONRAD K. BOWMAN
BY
McMorrow, Berman + Davidson
ATTORNEYS July 25, 1961 C. K. BOWMAN 2,993,721
LIQUID-BALLAST COMPARTMENTALIZED BUMPER
Filed Feb. 4, 1958 2 Sheets-Sheet 2
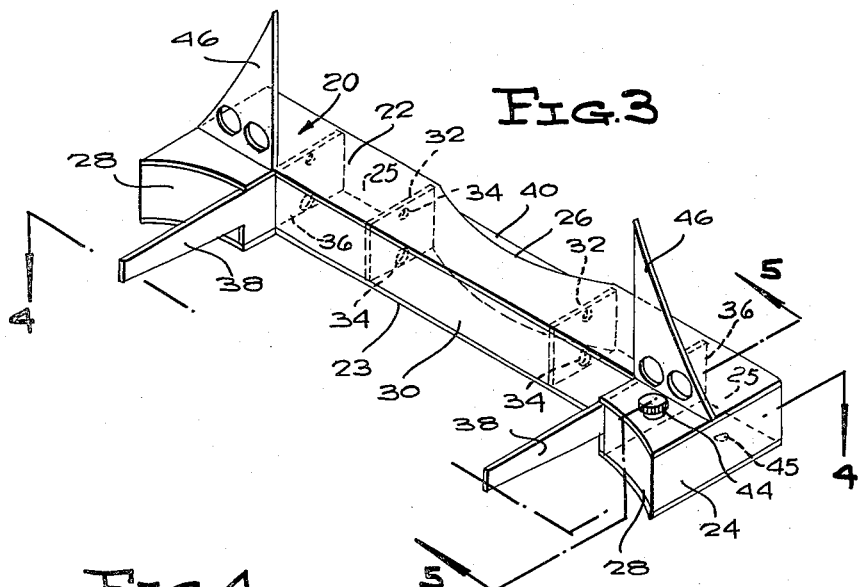
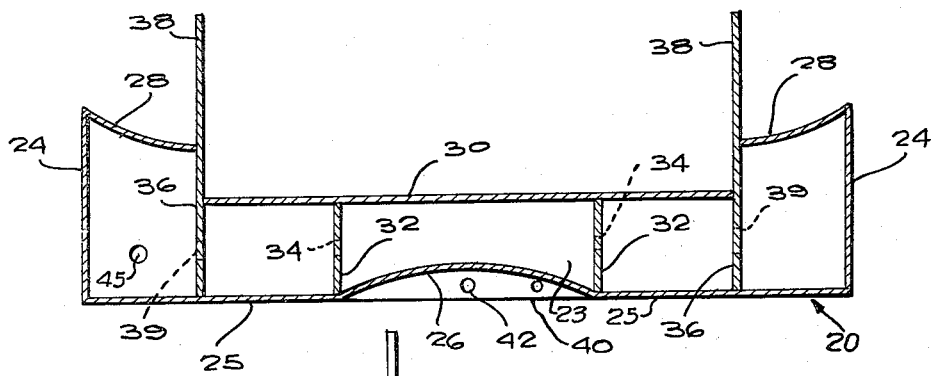
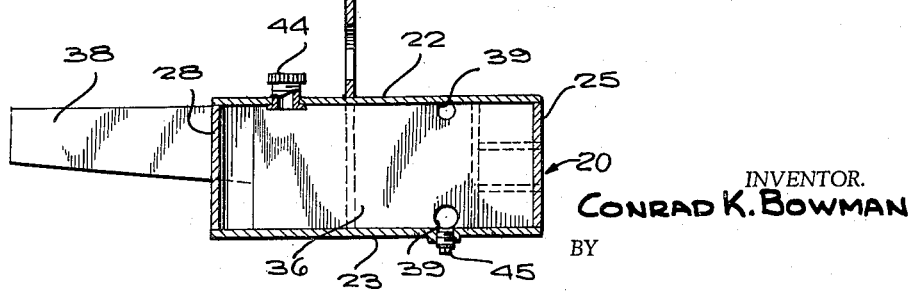
INVENTOR.
CONRAD K. BOWMAN
BY
McMorrow, Berman & Davidson
ATTORNEYS

United States Patent Office 2,993,721
Patented July 25, 1961

2,993,721
LIQUID-BALLAST COMPARTMENTALIZED BUMPER
Conrad K. Bowman, P.O. Box 547, Miranda, Calif.
Filed Feb. 4, 1958, Ser. No. 713,169
2 Claims. (Cl. 293—69)

This invention relates to bumpers for trucks and other vehicles, and more particularly has reference to a bumper especially intended for mounting upon the rear end of a truck for the purpose of providing stability and traction of the vehicle at the rear thereof.

Many vehicles, particularly light trucks such as the ordinary pick-up truck, are so designed that when they are not traveling with a load, they do not hold the road well. A truck is designed, in fact, to operate at maximum efficiency, so far as road-holding ability is concerned, when the truck has a load. When the truck is traveling empty, the rear end thereof, which normally bears the main part of the load, tends to be too light, and may skid laterally or bounce during movement of the vehicle.

The main object of the present invention is to obviate this tendency on the part of vehicles, through the provision of a hollow ballast bumper, provided upon the rear end of a truck or the like, which bumper can be filled with water or with other liquid, to provide a desirable weighting of the back end of the truck, improving stability and traction of the vehicle when the same is traveling empty.

Another object is to provide a ballast bumper of the character stated which will be so designed as to permit the same to be either filled or emptied with maximum ease and speed, thus permitting the bumper to be filled whenever the truck load is discharged, before the truck is driven empty, and thus permitting, further, the bumper to be drained of liquid whenever the truck is being loaded.

Another object is to provide a ballast bumper of the character described that will be designed for attachment to conventional pick-up trucks, without requiring modification or redesign of said trucks.

Another object is to provide a ballast bumper of the character described that will be adapted to haul water not only for the purpose of providing weight or ballast, but also for any other purposes, as for example fire prevention, domestic water needs, etc.

Another object is to provide a ballast bumper as stated which will be characterized by its relatively low cost, while still providing a bumper that is of substantial strength and that will afford a platform at the rear end of the vehicle truck bed.

Other objects will appear from the following description, the claims appended thereto, and from the annexed drawing, in which like reference characters designate like parts throughout the several views, and wherein:

FIGURE 1 is a perspective view showing the rear end of a light truck equipped with a ballast bumper according to the present invention;

FIGURE 2 is a fragmentary, enlarged, longitudinal section substantially on line 2—2 of FIGURE 1;

FIGURE 3 is a perspective view, on a scale enlarged slightly above that of FIGURE 1, showing the bumper per se;

FIGURE 4 is a horizontal section substantially on line 4—4 of FIGURE 3; and

FIGURE 5 is an enlarged, transverse sectional view, substantially on line 5—5 of FIGURE 3.

Referring to the drawing in detail, designated generally at 10 is a light truck, such as an ordinary pick-up truck having at its rear end a truck bed 12 provided with side walls 14 and a deck or platform 16. The usual tail gate 18 is provided upon the truck.

All this is conventional construction and does not, per se, constitute any part of the present invention.

The device constituting the present invention has been generally designated at 20, and comprises a bumper structure extending transversely of the rear end of the vehicle, and projecting both laterally and rearwardly from the truck bed, to provide full bumper protection at the rear of the vehicle. The bumper 20 has a top plate 22 and a bottom plate 23 disposed in horizontal planes, and the bumper also includes end plates or walls 24 and a back plate or wall 25, the wall 25 extending the full length of the top plate 22.

Thus, there is provided a hollow, elongated structure extending transversely of the vehicle, and the outer surfaces of the plate can be roughened or otherwise formed to provide non-slip surfaces which can be grasped, or on which one may stand while loading or unloading a vehicle.

In any event, referring to FIGURES 3–5, it will be understood that the device can be formed of a plurality of plates welded together, and the plates need not have any particular dimensions relative to one another, said dimensions being determined, of course, by the particular make and size of the truck on which the device is mounted.

In the illustrated example, which is considered as typical, the back wall 25 is formed, medially between the opposite sides of the device, with an arcuately shaped recess 26. Further, at opposite sides of the device, the end walls 24 are rigid, in their forward ends, with laterally inwardly extending, inwardly curved side portions 28 of a front wall that includes, also, the straight elongated intermediate portion 30. The side portions 28 are curved inwardly to fit the adjacent structural members of the particular pick-up truck on which the device is mounted, as will be readily understood.

Providing braces at suitable locations between the opposite ends walls 24 are brace plates 32, disposed at opposite extremities of the recess 26, and fixedly connected, as by welding, between the wall portion 30 and the back wall 25. The brace plates 32 are formed with openings 34, to permit the free flow of liquid into and between the several compartments defined within the bumper by the various brace plates.

There are also provided brace plates 36, which are disposed at and are welded to the opposite ends of the intermediate portion 30 of the front wall. These are also welded to the inner ends of the side portions 28 of the front wall, and are formed with forwardly projecting tongues 38 progressively reduced in width, providing hangers that are adapted to be fixedly connected to the adjacent side portions of the vehicle frame as shown in FIGURE 2.

Openings 39 are formed in the brace plates 36, for the same purpose as the openings 34.

It is desirable to provide means whereby a trailer can be attached to the vehicle. Accordingly, there are provided vertically spaced plates 40, having openings 42, the plates 40 extending within the recess 26, with the openings 42 permitting attachment of a trailer hitch and chain to the plates.

Referring to FIGURE 5, at one end of the device there is provided a filler opening, normally closed by a cap 44. Further, as shown in FIGURE 5, in the bottom plate 23 there is a drain opening normally closed by a drain plug 45. Filling and draining of the bumper with water or other liquid is thus permitted.

To reinforce the connection of the device to the truck, there are provided upstanding, triangular plates 46, welded upon and extending upwardly from the top plates 22 at opposite ends of the bumper, and welded also to the opposite side walls 14 as clearly shown in FIGURE 1.

A device as illustrated and described herein can be formed almost entirely or, for that matter, completely, of welded construction, although it is not critical to the invention that this type of construction be followed. In other words, it is not desired that the protection be limited to any particular construction details, since these might well be varied. It is mainly important to note that the bumper provides a hollow bumper structure extending transversely of the rear end of the vehicle, with the interior being adapted to hold a weighting means such as water, said weighting means being readily deposited in or removed from the bumper as desired.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claims.

What is claimed is:

1. A ballast bumper comprising an elongated normally horizontal closed hollow body having top, bottom, rear and front, and end walls, said rear and front walls being parallel and said rear wall being longer than said front wall and extended beyond the ends of the front wall, said end walls being spaced outwardly from the ends of the front wall, and said end walls extending forwardly beyond said front wall, other transverse walls extending inwardly from the forward ends of the end walls, outer partition walls extending across the interior of the bumper body at the locations of the inward ends of said other transverse walls and secured to said front, rear, top, and bottom walls, said outer partition walls having forwardly extending portions secured to the inward ends of said other transverse walls and reaching forwardly therefrom to provide mounting arms, and inner partition walls extending across the interior of the bumper body at points spaced inwardly from said outer partition walls and secured to said front, rear, top, and bottom walls, said inner partition walls defining a middle chamber therebetween, said inner and outer partition walls defining intermediate chambers therebetween, and said outer partition walls, said end walls, and said other transverse walls defining outer chambers in the bumper body, the outer and inner partition walls being apertured to provide communication between adjacent chambers, ballast liquid in said chambers, and filling means on said bumper body communicating with a chamber.

2. A ballast bumper comprising an elongated normally horizontal closed hollow body having top, bottom, rear and front, and end walls, said rear and front walls being parallel and said rear wall being longer than said front wall and extended beyond the ends of the front wall, said end walls being spaced outwardly from the ends of the front wall, and said end walls extending forwardly beyond said front wall, other transverse walls extending inwardly from the forward ends of the end walls, outer partition walls extending across the interior of the bumper body at the locations of the inward ends of said other transverse walls and secured to said front, rear, top, and bottom walls, said outer partition walls having forwardly extending portions secured to the inward ends of said other transverse walls and reaching forwardly therefrom to provide mounting arms, and inner partition walls extending across the interior of the bumper body at points spaced inwardly from said outer partition walls and secured to said front, rear, top, and bottom walls, said inner partition walls defining a middle chamber therebetween, said inner and outer partition walls defining intermediate chambers therebetween, and said outer partition walls, said end walls, and said other transverse walls defining outer chambers in the bumper body, the outer and inner partition walls being apertured to provide communication between adjacent chambers, ballast liquid in said chambers, and filling means on said bumper body communicating with a chamber, said rear wall having an indented middle portion extending between said inner partition walls, and a pair of vertically spaced horizontal hitch plates fixed to and extending rearwardly from said middle portion.

References Cited in the file of this patent
UNITED STATES PATENTS

| | | |
|---|---|---|
| 668,073 | Worth | Feb. 12, 1901 |
| 1,486,222 | Berry | Mar. 11, 1924 |
| 1,745,705 | Nordquist | Feb. 4, 1930 |
| 1,789,238 | Lancia | Jan. 13, 1931 |
| 1,995,088 | Bellamy | Mar. 19, 1935 |
| 2,181,772 | Snyder | Nov. 28, 1939 |
| 2,276,963 | Griffin | Mar. 17, 1942 |
| 2,299,421 | Essl | Oct. 20, 1942 |
| 2,492,914 | Barden | Dec. 27, 1949 |
| 2,649,308 | Bice | Aug. 18, 1953 |
| 2,650,851 | Leppaner | Sept. 1, 1953 |
| 2,701,728 | Miller | Feb. 8, 1955 |
| 2,797,121 | Aud | June 25, 1957 |
| 2,854,247 | Doxtator | Sept. 30, 1958 |